United States Patent
Sayyed et al.

(10) Patent No.: US 12,518,019 B2
(45) Date of Patent: Jan. 6, 2026

(54) SECURITY CONTEXT AWARE TELEMETRY

(71) Applicant: DELL PRODUCTS L.P., Round Rock, TX (US)

(72) Inventors: Ibrahim Sayyed, Georgetown, TX (US); Alan Abdelhalim, Pflugerville, TX (US); Daniel Hamlin, Round Rock, TX (US); Charles Robison, Buford, GA (US)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 18/363,913

(22) Filed: Aug. 2, 2023

(65) Prior Publication Data

US 2025/0045399 A1    Feb. 6, 2025

(51) Int. Cl.
   *G06F 21/57*   (2013.01)
(52) U.S. Cl.
   CPC .................. *G06F 21/572* (2013.01)
(58) Field of Classification Search
   CPC ................ G06F 21/572; G06F 21/575
   See application file for complete search history.

(56) References Cited

U.S. PATENT DOCUMENTS

| | | | |
|---|---|---|---|
| 9,710,762 B2 * | 7/2017 | Nakil | H04L 43/04 |
| 10,839,071 B2 | 11/2020 | Lamothe-Brassard | |
| 11,269,750 B2 | 3/2022 | Boyapalle et al. | |
| 2005/0216221 A1 * | 9/2005 | Broyles | G11B 33/144 |
| | | | 702/132 |
| 2008/0313312 A1 * | 12/2008 | Flynn | G06F 13/426 |
| | | | 709/224 |
| 2011/0029650 A1 * | 2/2011 | Shah | H04L 41/00 |
| | | | 709/223 |
| 2012/0215907 A1 * | 8/2012 | Chung | G06F 21/554 |
| | | | 709/224 |
| 2018/0136940 A1 * | 5/2018 | Mallichan | G06F 8/61 |
| 2018/0217888 A1 * | 8/2018 | Colgrove | G06F 11/3072 |
| 2018/0232521 A1 * | 8/2018 | Jeansonne | G06F 21/572 |

(Continued)

FOREIGN PATENT DOCUMENTS

CN    115269238 A   * 11/2022   .......... G06F 11/0787

OTHER PUBLICATIONS

Lin, Zhen-hua. CN 115269238 A (machine translation), published Nov. 1, 2022-. (Year: 2022).*

*Primary Examiner* — Michael Simitoski
(74) *Attorney, Agent, or Firm* — Larson Newman, LLP

(57) ABSTRACT

An information handling system has a storage device including a telemetry log, a BIOS configured to provide BIOS status data and BIOS security data, an OS configured to provide OS status data and OS security data, and a security management module. The security management module determines whether the information handling system is in a low-threat state or a high-threat state. When the information handling system is in the low-threat state, the security management module directs the BIOS to store the BIOS status data to the telemetry log and the OS to store the OS status data to the telemetry log. When the information handling system is in the high-threat state, the security management module directs at least one of the BIOS to store the BIOS security data and the OS to store the OS security data.

17 Claims, 3 Drawing Sheets

(56) References Cited

U.S. PATENT DOCUMENTS

| | | | | |
|---|---|---|---|---|
| 2018/0324027 | A1* | 11/2018 | Kondapi | H04L 41/046 |
| 2019/0012465 | A1* | 1/2019 | Kim | G06F 9/45558 |
| 2020/0159646 | A1* | 5/2020 | Fujii | G06F 11/0778 |
| 2020/0226262 | A1* | 7/2020 | Yeh | G06F 11/3476 |
| 2020/0250017 | A1* | 8/2020 | Samuel | G06F 9/542 |
| 2020/0364342 | A1* | 11/2020 | Martinez | G06F 9/441 |
| 2021/0026737 | A1* | 1/2021 | McAdams | G06F 9/542 |
| 2021/0034756 | A1* | 2/2021 | Vichare | G06F 21/57 |
| 2021/0208869 | A1* | 7/2021 | Nachimuthu | G06F 8/656 |
| 2022/0012339 | A1* | 1/2022 | Martinez | G06F 11/3006 |
| 2022/0188423 | A1* | 6/2022 | Ndu | G06F 21/577 |
| 2022/0269543 | A1* | 8/2022 | Samuel | G06F 9/5016 |
| 2022/0284097 | A1* | 9/2022 | McGarry | G06F 21/566 |
| 2024/0241965 | A1* | 7/2024 | Andrews | G06F 21/577 |
| 2024/0411904 | A1* | 12/2024 | Lewis | G06F 21/6218 |
| 2025/0077675 | A1* | 3/2025 | Stewart | G06F 21/64 |

* cited by examiner

SECURITY CONTEXT AWARE TELEMETRY

FIELD OF THE DISCLOSURE

This disclosure generally relates to information handling systems, and more particularly relates to providing security context aware telemetry in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a storage device including a telemetry log, a BIOS configured to provide BIOS status data and BIOS security data, an OS configured to provide OS status data and OS security data, and a security management module. The security management module may determine whether the information handling system is in a low-threat state or a high-threat state. When the information handling system is in the low-threat state, the security management module may direct the BIOS to store the BIOS status data to the telemetry log and the OS to store the OS status data to the telemetry log. When the information handling system is in the high-threat state, the security management module may direct at least one of the BIOS to store the BIOS security data and the OS to store the OS security data.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
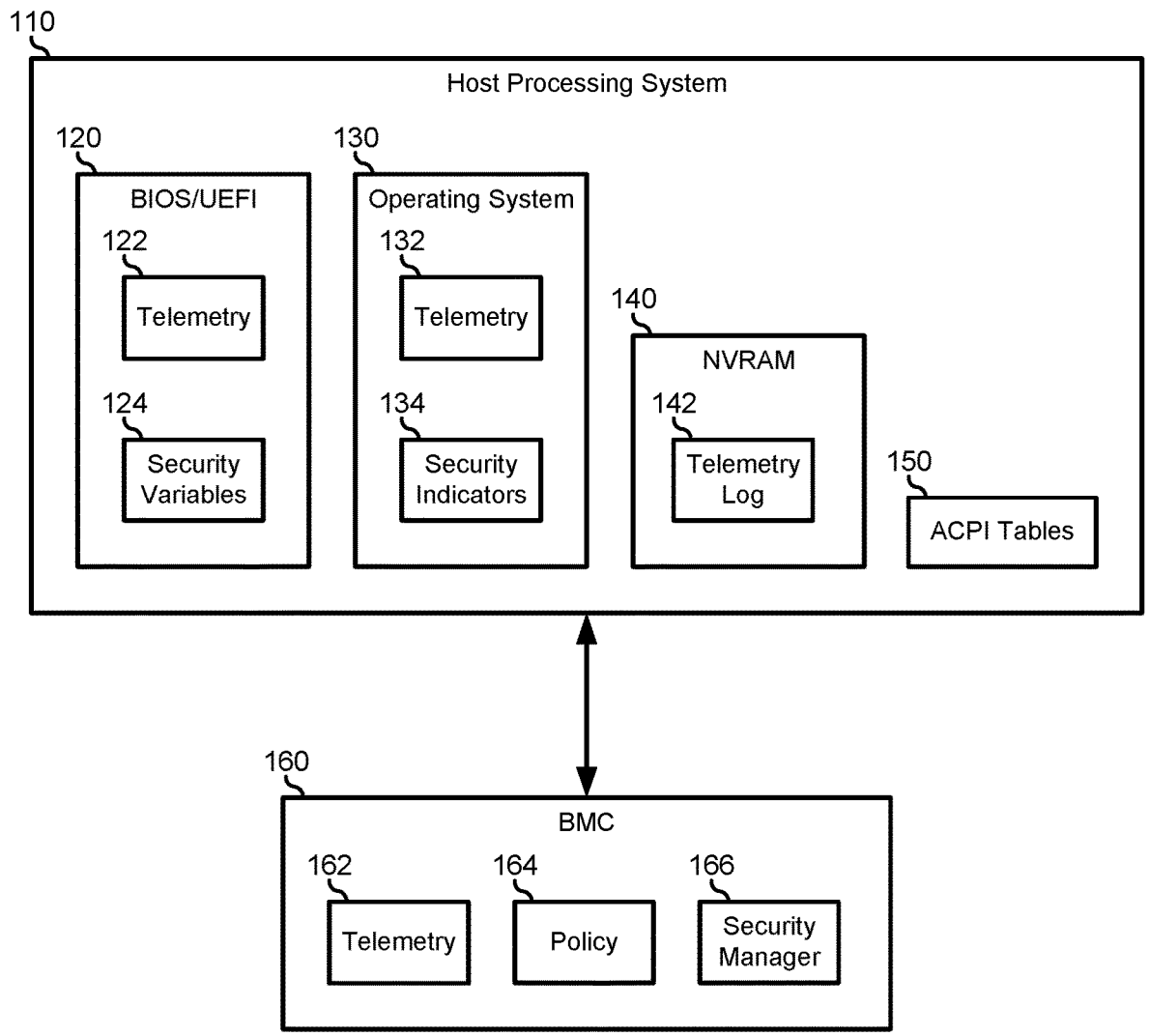
FIG. 1 is a block diagram of an information handling system according to an embodiment of the disclosure.

FIG. 1 illustrates an information handling system 100 including a host processing system 110 and a baseboard management controller 160. Host processing system 110 represents a processing environment provided on information handling system 100 to perform the processing tasks such as are typically associated with an information handling system, a computer, a mobile device, or the like, and may include hardware, firmware, and software elements as needed or desired to perform the processing tasks. In particular, host processing system may include elements such as the components as shown in the information handling system 300 in FIG. 3. Host processing system 110 includes a basic input/output system (BIOS)/universal extensible firmware interface (UEFI) 120, an operating system (OS) 130, a non-volatile random access memory (NVRAM) device 140, and Advanced Control and Power Interface (ACPI) tables 150.

BIOS/UEFI 120 represents machine executable code that operates during a boot phase of operation of information handling system 100 to initialize the hardware and firmware elements of the information handling system, to launch OS 130, and to pass control of the operation host processing system 110 during a runtime phase to the OS. BIOS/UEFI 120 further operates during the runtime phase to handle low-level service calls and procedures, as needed or desired. BIOS/UEFI 120 operates to monitor, manage, and maintain various telemetry data 122 regarding the status, operating condition, and health of the elements of the BIOS/UEFI.

An example of telemetry data 122 may include indications of deviations in an expected boot path, indications of deviations in an expected boot shell execution, deviations in an expected boot phase duration, a secure boot setting being disabled, a detected attack on a Serial Peripheral Interface (SPI), the addition or deletion of secure boot keys, a number of unsuccessful password unlock attempts exceeding a limit, a hardware device change on the information handling system, an attempt to access an EFI System Partition (ESP) outside of a known BIOS or OS trust boundary, and the like. During the boot phase, BIOS/UEFI 120 operates to set up information handling system 100 with various security variables 124 that protect the operation of the information handling system from malicious attacks. An example of security variables may include a chassis intrusion indication, a boot path security setting, a Windows System Management Mode (SMM) Security Mitigation Table (WSMT), a Virtualization Based Security (VBS) setting, and the like.

OS 130 represents machine executable code that operates during the runtime phase of operation of information handling system 100 to establish an operating environment within which to launch programs, processes, utilities, and the like, to perform processing tasks as directed by a user of the information handling system. OS 130 includes OS telemetry 132, and OS security indicators 134. An example of OS telemetry 132 may include OS status indicators, such as running applications, processes, and thread counts, resource allocations and usages such as network traffic, storage traffic and allocation, and the like, various driver status indicators, other status indicators that are available through the OS.

An example of OS security indicators 134 may include a detection that a developer mode is enabled, a detection that an antivirus software or a firewall is off or has experienced setting changes, a detection that unsigned or untrusted PowerShell scripts have been allowed, a detection that a connection has been established to an unsecured Wi-Fi network, a detection that a memory integrity setting has been disabled, a detection that a Trusted Platform Module (TPM) has been disabled, a detection that a kernel direct memory access (DMA) protection has been disabled, or the like. Other OS security indicators 134 may include a detection of attempts to access CPU and Kernel driver managed registers such as machine status registers (MSRs), a detection of an unsuccessful re-imaging attempt, a detection of an unsuccessful data wipe attempt, a detection of an attempt to mount the ESP from OS 130, a detection of an attempt to run an untrusted program, or the like.

NVRAM 140 represents a persistent memory device of information handling system 100 that retains the data stored thereon during power cycle events on the information handling system. NVRAM 140 includes a telemetry log 142 that is utilized to store selected items of the telemetry data as described herein. An example of telemetry data that may be stored in telemetry log 142 may include information on NVRAM 140 itself, including error rate data, diagnostic data, boot duration data, connectivity data, performance data, auto-heal and recovery data, BIOS configuration data, or the like. In a particular embodiment, the amount of storage space on NVRAM 140 that is allocated to telemetry log 142 may be limited, such as where the telemetry log has an allocated storage space of 8 kilobytes (KB).

ACPI tables 150 are typically provided to pass configuration and system power settings between BIOS/UEFI 120 and other elements of information handling system 100. For the purposes of the current disclosure, ACPI tables 150 include information related to detected security alerts that may be utilized with respect to the current embodiments to determine the complexion of the telemetry data that is gathered on information handling system 100, as described further below. ACPI tables are known in the art and will not be further described herein, except as may be needed to illustrate the current embodiments.

BMC 160 represents a processing system separate from host processing system 110 that operates to monitor, manage, and maintain the operating state of information handling system 100. BMC 160 includes BMC telemetry 162, a telemetry monitoring policy 164, and a system security manager 166. An example of BMC telemetry 162 includes information related to the status of the hardware and firmware root of trust, Serial Peripheral Interface (SPI) intrusion indicators, battery power drain indicators, system intrusion detection, and the like. Telemetry monitoring policy 164 and system security manager 166 will be described further below.

Various telemetry data is typically collected within computing devices to monitor the health, performance, and security by sampling an array of metrics. However in normal operation, the collected telemetry typically represents high-level status information, but without much depth of information content for any particular set of telemetry data. When an unusual event occurs, the high-level telemetry data is typically insufficient to analyze or mitigate the event. In particular, as noted above, in host processing system 110, telemetry log 142 may represent a small partition of NVRAM 140 (for example 8 KB), which may be sufficient to collect a broad range of high-level telemetry data, but which may yet be insufficient to collect the more detailed telemetry data that might be needed to analyze or mitigate an event. Moreover, the routine collection of additional telemetry data during normal operation is typically unacceptable, as the collection of such additional telemetry data negatively impacts processor loading, battery life, and other resources of information handling system 100.

In a particular embodiment, system security manager 166 utilizes the telemetry data collected and stored to telemetry log 142 to determine an overall security level for information handling system 100. In particular, the telemetry data stored in telemetry log 142 may be characterized by system security manager 160 as indicating a low-threat-level security (L1) environment where threats to the environment are deemed to be low, and a high-threat-level security (L2) environment where threats to the environment are deemed to be high. When system security manager 160 determines that information handling system 100 is in the low-threat-level (L1) state, then the system security manager directs the information handling system to continue to collect the high-level status information for storage in telemetry log 142. On the other hand when system security manager 160 determines that information handling system 100 is in the high-threat-level (L2) state, then the system security manager directs the information handling system to switch to the collection of more detailed status information for the telemetry items most closely associated with the source of the increased threat assessment. The detailed status information can then be used for more in depth analysis or mitigation of the threat. Then at a later time, when system security manager 160 determines that information handling system 100 has reentered the low-threat-level (L1) state, then the system security manager directs the information handling system to resume the collection of the high-level status information for storage in telemetry log 142.

Examples of events that may indicate a heightened threat level that result in entering the high-threat-level (L2) state may include boot deviation telemetry, such as when a user attempts to boot from a USB drive, administrator password change attempts or unsuccessful log-in attempt counts, or the like. Other examples may include unusual or heightened activity indicators like increase network utilization including data uploading and exfiltration, unusual log-in activity such as log-in attempts at unusual hours, OS user password change attempts or unsuccessful log-in attempt counts, system security setting changes such as disabling firewalls or antivirus software, increased resource utilization such as CPU, storage, memory, or network utilization, or the like. Similarly, hardware events may indicate a heightened threat level, such as excessive access attempts from OS 130 to BMC 160, unusual or increased access attempts to the SPI, excessive system management interrupt (SMI) activity, USB overcurrent detection, or the like.

In a particular embodiment, when system security manager 160 determines that information handling system 100 is in the high-threat-level (L2) state, then the information handling system continues to store the more detailed telemetry information to telemetry log 142 and deemphasizes the collection of the high-level status information for telemetry items that are unrelated to the source of the increased threat assessment. For example, when the source of the increased threat assessment is related to telemetry data 122 in BIOS/UEFI 120, then the storage space of telemetry data 142 may be more advantageously utilized for storing additional elements of telemetry data 122 and of security variables 124, and may overwrite telemetry data associated with telemetry data 132 or security indicators 134 in OS 130, and telemetry data associated with telemetry data 162 in BMC 160, as needed or desired.

In another embodiment, when system security manager 160 determines that information handling system 100 is in the high-threat-level (L2) state, then the information handling system continues to store the high-level status information in telemetry log 142, and allocates additional storage capacity, such as an extended partition of NVRAM 140, or another storage device of information handling system 100 to store the more detailed status information for the telemetry items most closely associated with the source of the increased threat assessment. In this way, the telemetry data stored in telemetry log 142 can still be utilized to assess additional threats to information handling system 100. In particular, in the previous embodiment where the detailed status information is stored in telemetry log 142, a new threat related to some element of telemetry data that has been deemphasized for storage may go undetected.

An example of high-level status information that may be gathered in the high-threat-level (L2) state may include directing BIOS/UEFI 120, OS 130, or BMC 160 to tag telemetry data that relates to the cause of the increased threat level, directing the OS to increase telemetry collection for functions and features that relate to the cause of the increased threat level, such as tracking the source of increase log-in attempts, the source of increased network utilization, changes to firewall or proxy settings, antivirus status and mitigation information, or the like. Increased monitoring of BIOS/UEFI 120 may include secure boot setting changes, boot deviations, firmware module checksum or validation failures, or the like. Increased monitoring of BMC 160 may include directing the BMC to monitor BMC firmware security events, such as disabling of boot deviation tracking, password changes, power or thermal setting changes, or the like.

Figure 2:
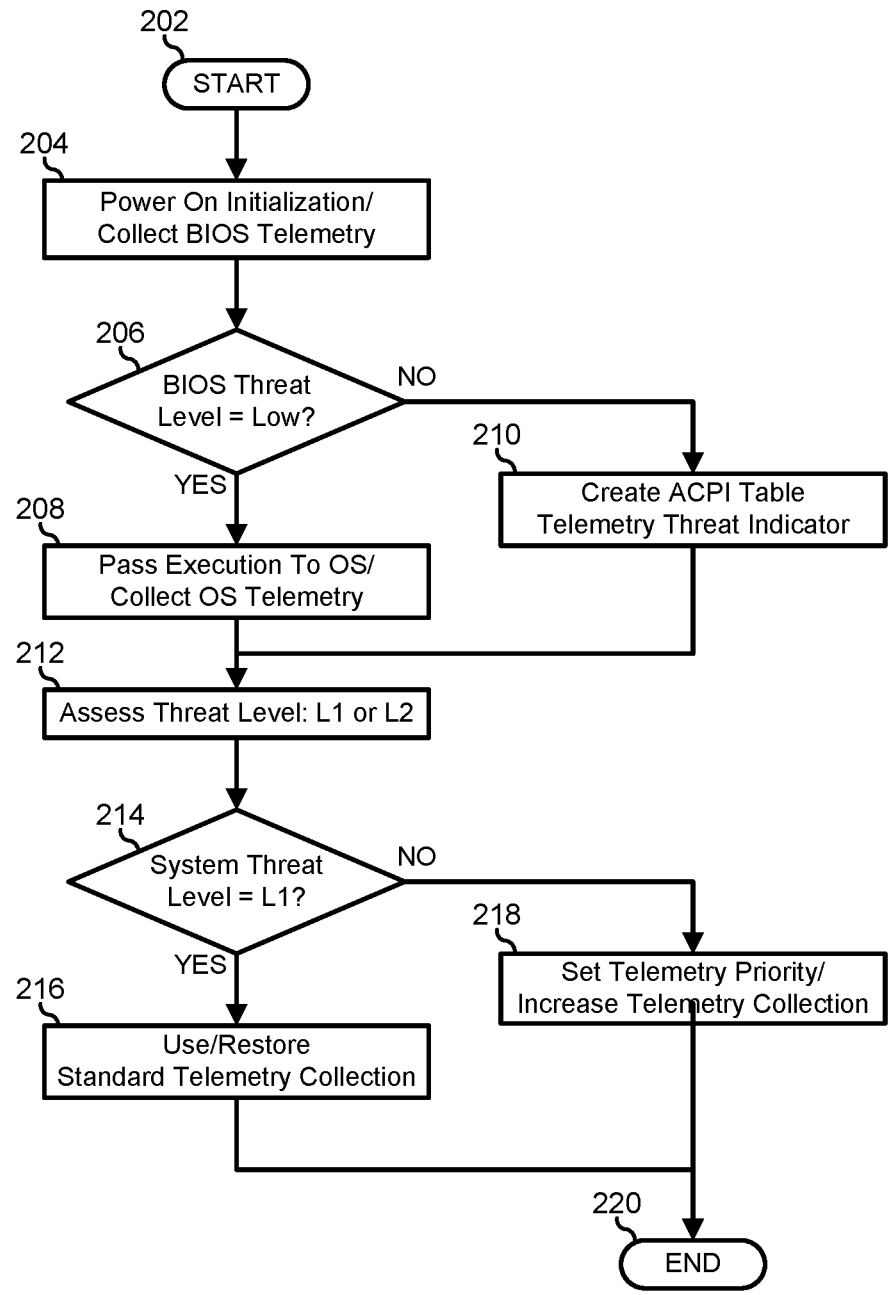
FIG. 2 is a flowchart illustrating a method for providing security context aware telemetry in an information handling system according to an embodiment of the current disclosure.

FIG. 2 illustrates a method 200 for providing security context aware telemetry in an information handling system starting at block 202. An information handling system is powered on and BIOS telemetry data is collected in block 204. A system security manager determines whether or not the BIOS telemetry data indicates that the threat level is low in decision block 206. If so, the "YES" branch of decision block 206 is taken, the execution is passed from the BIOS to the OS and the OS telemetry data is collected in block 208, and the method proceeds to block 212 as described below. If the BIOS telemetry data indicates that the threat level is not low, the "NO" branch of decision block 206 is taken, an ACPI table entry with a telemetry threat indicator is created in block 210, and the method proceeds to block 212.

In block 212, the system security manager assesses whether the information handling system is in the low-threat-level (L1) state or the high-threat-level (L2) state in block 212, and a decision is made as to whether or not the information handling system is in the low-threat-level (L1) state in decision block 214. If so, the "YES" branch of decision block 214 is taken, the information handling system is set/restored to the standard telemetry data collection in block 216, and the method ends in block 220. If the information handling system is not in the low-threat-level (L1), the "NO" branch of decision block 214 is taken, the information handling system sets the priority on the type of telemetry collection and increases the telemetry collection on behavioral and security related incidents in block 218, and the method ends in block 220.

Figure 3:
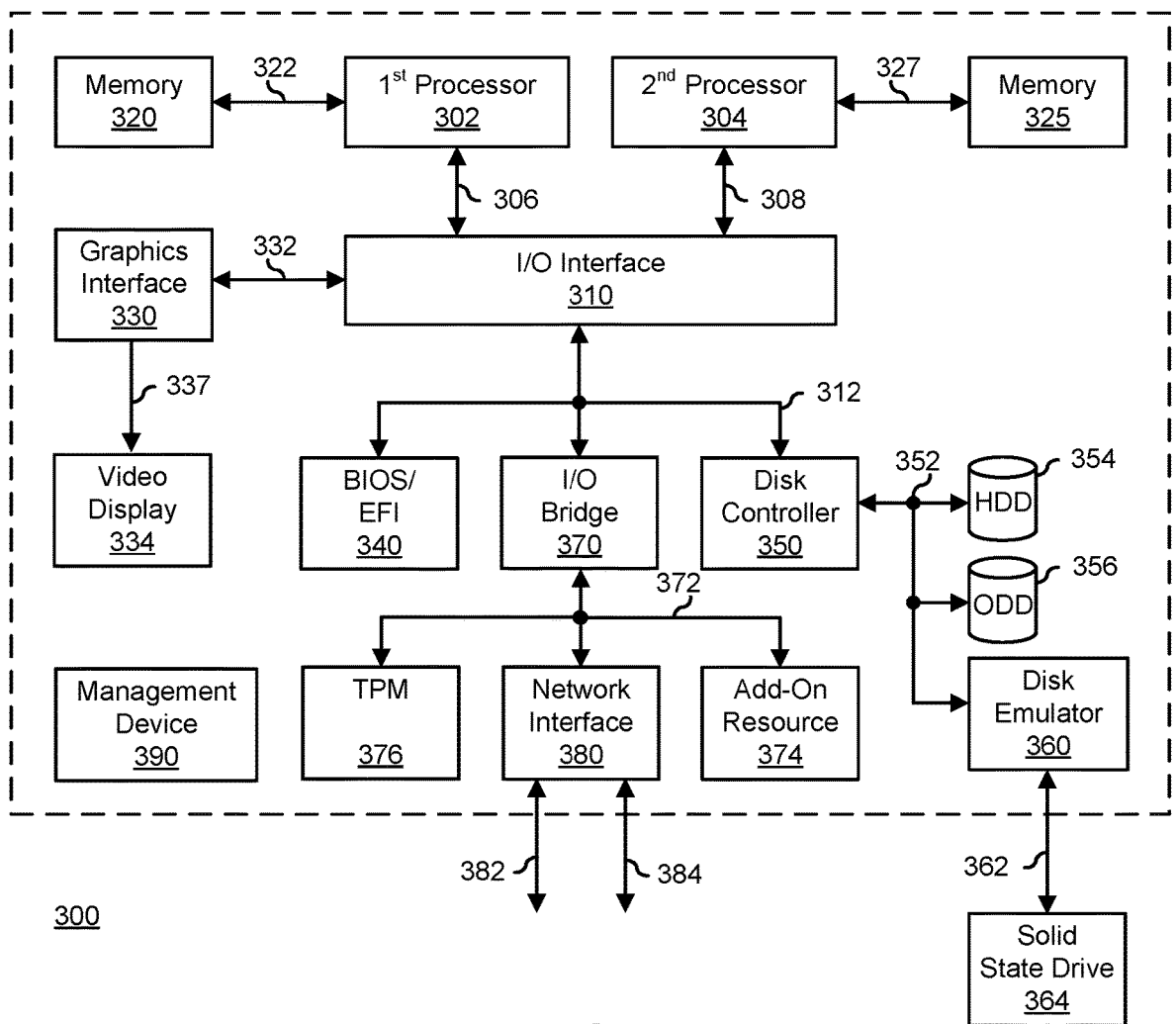
FIG. 3 is a block diagram of a general information handling system according to an embodiment of the present disclosure . . .

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 3394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a storage device including a telemetry log;
   a basic input/output system (BIOS) configured to provide BIOS status data and BIOS security data;
   an operating system (OS) configured to provide OS status data and OS security data; and
   a security manager instantiated on a processor and configured to determine whether the information handling system is in a low-threat state or a high-threat state, to direct the BIOS to store the BIOS status data to the telemetry log and the OS to store the OS status data to the telemetry log when the information handling system is in the low-threat state, and to direct at least one of the BIOS to store the BIOS security data and the OS to store the OS security data when the information handling system is in the high-threat state, wherein the security manager includes a telemetry policy module that provides correlations between the BIOS status data and the OS status data, wherein the security manager is further configured to determine a threat state based on the correlations.

2. The information handling system of claim 1, wherein, when the information handling system is in the high-threat state, the security manager is further configured to direct the at least one of the BIOS to store the BIOS security data to the telemetry log and the OS to store the OS security data to the telemetry log.

3. The information handling system of claim 2, wherein, when the security manager directs the BIOS to store the BIOS security data to the telemetry log, the security manager further directs the OS to halt storing the OS status data to the telemetry log.

4. The information handling system of claim 2, wherein, when the security manager directs the OS to store the OS security data to the telemetry log, the security manager further directs the BIOS to halt storing the BIOS status data to the telemetry log.

5. The information handling system of claim 1, wherein, when the information handling system is in the high-threat state, the security manager is further configured to direct the at least one of the BIOS to store the BIOS security data to a location other than the telemetry log and the OS to store the OS security data to the other location.

6. The information handling system of claim 5, wherein, when the security manager directs the BIOS to store the BIOS security data to the other location, the security manager further directs the BIOS to continue storing the OS status data to the telemetry log.

7. The information handling system of claim 5, wherein, when the security manager directs the OS to store the OS security data to the other location, the security manager further directs the OS to continue storing the OS status data to the telemetry log.

8. The information handling system of claim 1, further comprising:
   a baseboard management controller (BMC), wherein the security manager is included in the BMC.

9. The information handling system of claim 1, wherein the threat state includes one of a low-threat state and a high-threat state.

10. A method, comprising:
    providing, in a storage device of an information handling system, a telemetry log;
    providing, by a basic input/output system (BIOS) of the information handling system, BIOS status data and BIOS security data;
    providing, by an operating system (OS) of the information handling system, OS status data and OS security data;
    determining, by a security manager of the information handling system, whether the information handling system is in a low-threat state or a high-threat state;
    directing the BIOS to store the BIOS status data to the telemetry log and the OS to store the OS status data to the telemetry log when the information handling system is in the low-threat state; and
    directing at least one of the BIOS to store the BIOS security data and the OS to store the OS security data when the information handling system is in the high-threat state;
    wherein, when the information handling system is in the high-threat state, the method further comprises directing the at least one of the BIOS to store the BIOS security data to a locations other than the telemetry log and the OS to store the OS security data to the other location; and
    wherein when the security manager directs the BIOS to store the BIOS security data to the other location, the method further comprises directing the BIOS to continue storing the OS status data to the telemetry log.

11. The method of claim 10, wherein, when the information handling system is in the high-threat state, the method further comprises directing the at least one of the BIOS to store the BIOS security data to the telemetry log and the OS to store the OS security data to the telemetry log.

12. The method of claim 11 wherein, when the security manager directs the BIOS to store the BIOS security data to the telemetry log, the method further comprises directing the OS to halt storing the OS status data to the telemetry log.

13. The method of claim 11 wherein, when the security manager directs the OS to store the OS security data to the telemetry log, the method further comprises directing the BIOS to halt storing the BIOS status data to the telemetry log.

14. The method of claim 10, wherein when the security manager directs the OS to store the OS security data to the other location, the method further comprises:
    directing the OS to continue storing the OS status data to the telemetry log.

15. The method of claim 10 further comprising providing, on the information handling system, a baseboard management controller (BMC), wherein the security manager is included in the BMC.

16. The method of claim 15 wherein the BMC further includes a telemetry policy module, the policy module including correlations between the BIOS status data and the OS status data, and wherein the security manager determines whether the information handling system is in the low-threat state or the high-threat state based upon the correlations.

17. An information handling system, comprising:
    a storage device including a telemetry log;

a basic input/output system (BIOS) configured to provide BIOS status data and BIOS security data;

an operating system (OS) configured to provide OS status data and OS security data;

a baseboard management controller (BMC) configured to provide BMC status data and BMC security data; and a security manager instantiated on a processor and configured to 1) determine whether the information handling system is in a low-threat state or a high-threat state, 2) direct the BIOS to store the BIOS status data to the telemetry log, the OS to store the OS status data to the telemetry log, and the BMC to store the BMC status data to the telemetry log when the information handling system is in the low-threat state, and 3) direct at least one of the BIOS to store the BIOS security data, the OS to store the OS security data, and the BMC to store the BMC security data when the information handling system is in the high-threat state, wherein the security manager includes a telemetry policy module that provides correlations between the BIOS status data and the OS status data, wherein the security manager is further configured to determine a threat state based on the correlations.

* * * * *